United States Patent
Cmich

(10) Patent No.: US 7,878,313 B2
(45) Date of Patent: Feb. 1, 2011

(54) DOUBLE OVERLAP BACKING PLATE ATTACHMENT

(75) Inventor: Ryan Cmich, Sharon Township, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 232 days.

(21) Appl. No.: 12/315,888

(22) Filed: Dec. 8, 2008

(65) Prior Publication Data

US 2009/0152067 A1   Jun. 18, 2009

Related U.S. Application Data

(60) Provisional application No. 61/007,412, filed on Dec. 12, 2007.

(51) Int. Cl.
*F16H 45/02*   (2006.01)
(52) U.S. Cl. ........................... 192/3.3; 192/112
(58) Field of Classification Search ............... None
See application file for complete search history.

(56) References Cited

U.S. PATENT DOCUMENTS

| 6,298,965 | B1 | 10/2001 | Krause et al. | |
|---|---|---|---|---|
| 6,688,441 | B1 | 2/2004 | Arhab et al. | |
| 2005/0056512 | A1* | 3/2005 | Sasse et al. | 192/3.3 |
| 2008/0000745 | A1* | 1/2008 | Swank et al. | 192/3.29 |
| 2008/0277227 | A1* | 11/2008 | Jameson et al. | 192/3.33 |
| 2009/0078522 | A1* | 3/2009 | Jung et al. | 192/3.29 |

* cited by examiner

*Primary Examiner*—Richard M. Lorence
(74) *Attorney, Agent, or Firm*—Simpson & Simpson, PLLC

(57) ABSTRACT

A torque converter having a transverse axis of rotation, a cover having an inner diameter and an inner annular surface, an impeller shell having an inner diameter and an inner annular surface, and an annular backing plate having an outer diameter and an outer annular surface, wherein the cover, impeller shell, and backing plate are operatively arranged to rotate about the axis of rotation, wherein the backing plate is substantially orthogonal with respect to the axis of rotation, wherein the inner diameter of the cover is substantially equal to the inner diameter of the impeller shell, and wherein the inner annular surface of the cover and the inner annular surface of the impeller shell are fixedly attached to the outer annular surface of the backing plate.

15 Claims, 3 Drawing Sheets

DOUBLE OVERLAP BACKING PLATE ATTACHMENT

CROSS-REFERENCE TO RELATED APPLICATIONS

This application claims the benefit under 35 U.S.C. §119 (e) of U.S. Provisional Application No. 61/007,412 filed on Dec. 12, 2007 which application is incorporated herein by reference.

FIELD OF THE INVENTION

The present invention relates generally to torque converters. In particular, the present invention relates to torque converter housing attachments for internal torque-transmitting components.

BACKGROUND OF THE INVENTION

It is well known in the art of torque converters for a torque converter to have a housing that comprises a cover and an impeller shell. It is also known in the art of torque converter clutch design to have an internal component fixedly attached to the housing in order to transmit torque from the housing to mating components, such as, clutch plates. In one particular design, the internal component is an annular plate, orthogonal with respect to the torque converter's axis of rotation, attached to the housing via mechanical fasteners, such as, splined engagements, or via metal inert gas (MIG) welding, tungsten inert gas (TIG) welding, or laser welding, or some combination thereof. When the housing rotates, it transmits torque to the plate. The plate, in turn, transmits the torque to mating components, which are generally a stack of annular clutch plates, through one or more frictional engagements therebetween. Unfortunately, prior torque converter clutch designs of this type suffer from a number of drawbacks.

For example, U.S. Pat. No. 6,688,441 (Arhab) discloses a torque converter with an annular plate fixedly attached to the housing of the torque converter for transmitting torque to mating components. Arhab discloses a number of embodiments, each of which suffers from one or more drawbacks. FIG. 1 of the Arhab patent shows a torque converter housing wherein an annular front axial skirt of the front shell (cover) extends past an annular torque-transmitting plate component, to which it is attached via a weld seam. It overlaps the annular rear axial skirt of the rear (impeller) shell, to which it also attached via a weld. One drawback of this embodiment is that the front shell (cover) is costly to manufacture, especially if it is stamped piece. A cover with an axial skirt long enough to overlap both the plate and the impeller shell uses an excessive amount of raw material, which is costly and renders the overall torque converter excessively heavy. Further, if the cover is a stamped piece, which it generally is, a long axial skirt is often unintentionally deformed during manufacture due to the resistance of the cover material to the stamping process, colloquially known in the art as "potato chipping". Further, the various types of welding used to attach the housing to the torque-transmitting plate component often leads to the deformation of the plate component. Additionally, in designs wherein the cover overlaps the impeller shell, or vice versa, the overall radial package of the torque converter is excessive.

FIGS. 5, 7, and 9 of the Arhab patent show embodiments wherein the housing is attached to the torque-transmitting plate mechanically, for example, via splined engagements or retaining rings. Mechanical fasteners are inherently prone to rattling during operation because the components, while well-machined, are not fixedly attached to each other and vibrate and/or hit against each other during operation.

FIGS. 11 and 16 of the Arhab patent show embodiments wherein the cover is welded to the torque-transmitting plate on the interior of the torque converter. Welding in the interior of a torque converter leads to undesirable contamination within the torque converter which adversely affects its operation.

Thus, there is a long-felt need for a torque converter, wherein its housing is fixedly attached to an internal torque-transmitting plate, and does not suffer from the drawbacks described above. In particular, there is a long-felt need for a torque converter of this type that is less costly to manufacture, creates a more stable torque-transmitting plate component that deforms less from welding, is lighter, has a reduced overall radial package, does not rattle, and reduces the risk of internal contamination via welding its components primarily on its exterior.

BRIEF SUMMARY OF THE INVENTION

The present invention is a torque converter comprising: a transverse axis of rotation; a cover having an outer diameter, an inner diameter, and an axial inner annular surface; an impeller shell having an outer diameter, an inner diameter, and an axial inner annular surface; and, an annular backing plate having an outer diameter, and an axial outer annular surface, wherein the cover, impeller shell, and backing plate are operatively arranged to rotate about the axis of rotation, wherein the backing plate is substantially orthogonal with respect to the axis of rotation, wherein the outer diameter and the inner diameter of the cover is substantially equal to the outer diameter and the inner diameter of the impeller shell, respectively, and wherein the axial inner annular surface of the cover and the axial inner annular surface of the impeller shell are fixedly attached to the axial outer annular surface of the backing plate. In a preferred embodiment of the present invention, the annular backing plate includes an annular wall axially extending from its outer diameter.

During operation, the cover and impeller shell transmit torque to the annular backing plate. In a preferred embodiment, the torque converter further comprises at least one mating component, preferably an annular plate substantially orthogonal to the axis of rotation, and the backing plate further comprises an annular surface substantially orthogonal to the axis of rotation. The mating component is in frictional engagement with the annular surface of the backing plate. During operation the backing plate transmits torque to the mating component. In a preferred embodiment the torque converter includes a set of mating components serially arranged along the axis of rotation, each in frictional engagement with the next. During operation the housing, i.e., the cover and impeller shell, transmits torque to the backing plate, which transmits torque to the set of mating components serially through the frictional engagements.

It is an object of the present invention to provide a torque converter design of the type described above that is less costly to manufacture and assemble than prior designs.

It is another object of the present invention to provide a torque converter of this type that light, has a reduced overall radial package, does not rattle, and reduces the risk of internal contamination via welding its components primarily on its exterior.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
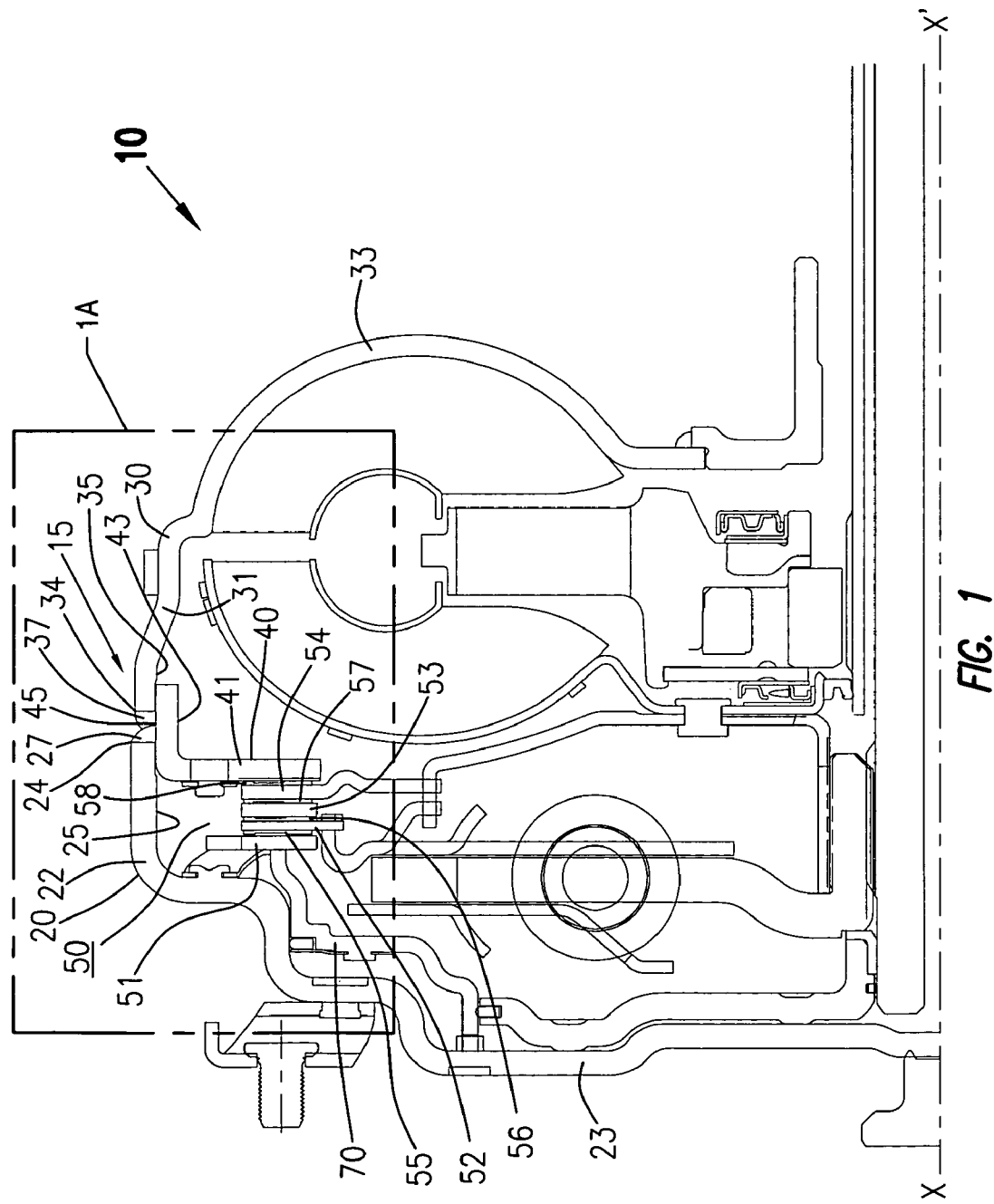
FIG. 1 is a partial cross-sectional view of a present invention torque converter.

FIG. 1 is a partial cross-sectional view of present invention torque converter 10. Torque converter 10 comprises converter housing 15 and backing plate 40, converter housing 15 comprising cover 20 and impeller shell 30, all of which are operatively arranged to rotate about transverse axis X-X'. Torque converter 10 further comprises piston plate 70. Hereinafter, the directional term "front" refers to that which is oriented towards X, and the directional term "rear" refers to that which is oriented towards X'.

Cover 20 comprises front wall 23, substantially orthogonal with respect to axis X-X', and annular wall 22 axially directed toward the rear. Annular wall 22 comprises annular edge 24 and axial inner annular surface 25. Cover 20 further comprises an outer diameter and an inner diameter, described in detail infra. In one embodiment of the present invention, cover 20 is formed from stamped metal.

Impeller shell 30 comprises semi-toroidal envelope 33, substantially orthogonal with respect to axis X-X', and annular skirt 31 axially directed toward the front. Annular skirt 31 comprises annular edge 34 and axial inner annular surface 35. Impeller shell 30 further comprises an outer diameter and an inner diameter, described in detail infra.

Backing plate 40 comprises annular plate 41, substantially orthogonal with respect to axis X-X' and having an outer diameter, described in detail infra, and annular wall 43 extending axially from the outer diameter of plate 41 toward the rear, annular wall 43 having axial outer annular surface 45.

Figure 1A:
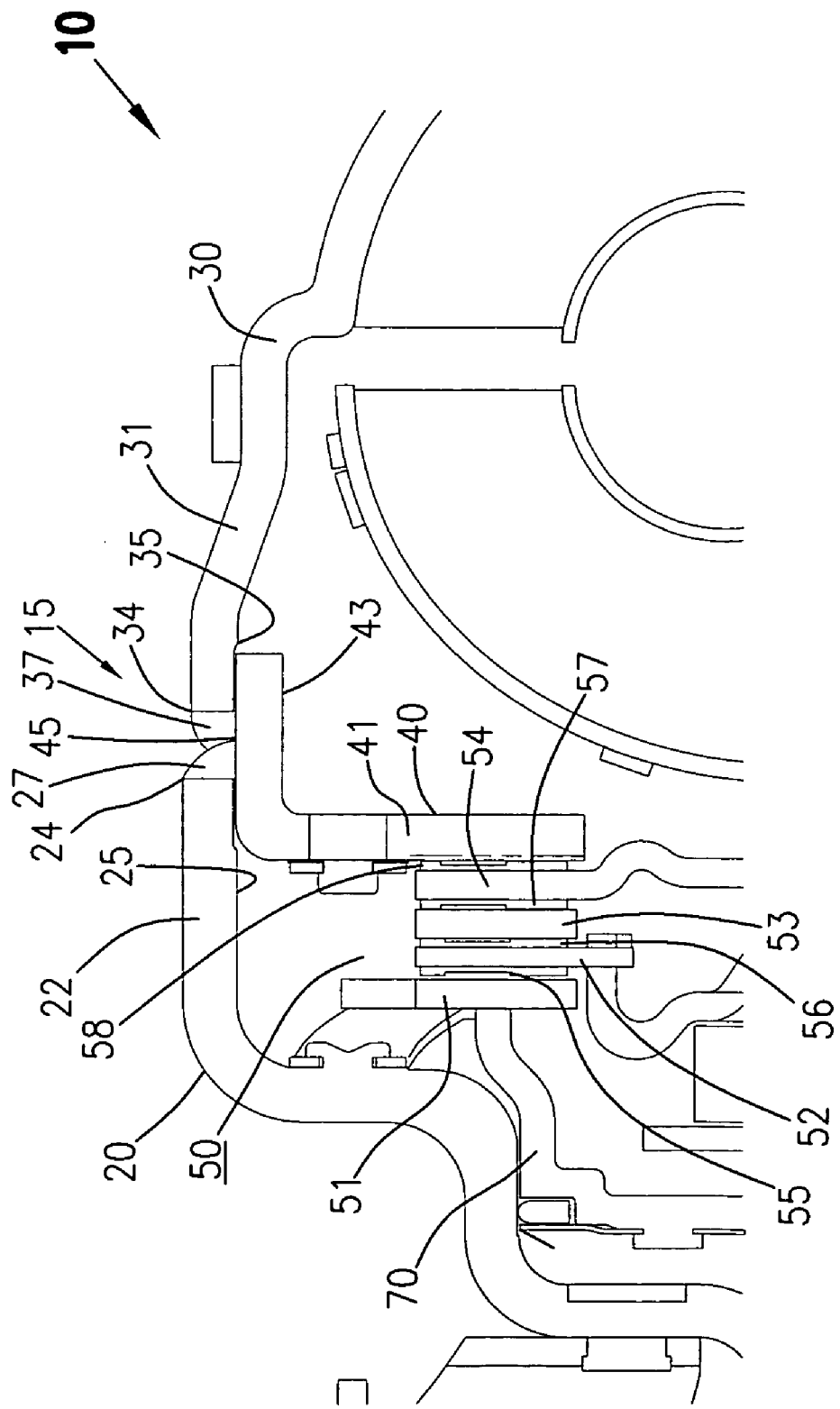
FIG. 1A is an enlarged view of the present invention torque converter as shown in area 1A of FIG. 1; and, FIG. 2 is a partial cross-sectional view of a present invention torque converter showing the inner and outer diameters of particular components thereof.

FIG. 1A is an enlarged view of area 1A shown in FIG. 1. As can be seen in this figure, both wall 22 and skirt 31 overlap backing plate 40 such that a portion of axial inner annular surface 25 of wall 22 and a portion of axial inner annular surface 35 of skirt 31 are in intimate contact with axial outer annular surface 45 of wall 43. Wall 22 and skirt 31 are fixedly attached to axial outer annular surface 45 of backing plate 40.

In a preferred embodiment of the present invention, converter housing 15 is operatively arranged to transmit torque to backing plate 40. Backing plate 40 further comprises radial annular surface 58. In a preferred embodiment, backing plate 40 is operatively arranged to transmit torque to set of mating components 50, which comprise at least one mating component, such as output plate 54, and may further comprise output plate 52. Output plates 54 and 52 are operatively arranged to transmit torque to the transmission of a vehicle. Backing plate 40 transmits torque to output plate 54 through a frictional engagement between radial annular surface 58 and output plate 54. In one embodiment, mating component 54 comprises an annular plate. In a preferred embodiment, set of mating components 50 comprise a series of mating components 54, 53, 52, and 51, which are operatively arranged to serially transmit torque via frictional engagements 57, 56, and 55, respectively. Mating components 51 and 53 are operatively arranged to receive torque from the engine of a vehicle. For example, mating component 51 may be attached to cover 20 via a mechanical engagement, such as, a leaf spring attachment. In a preferred embodiment, set of mating components 50 comprise a stack of clutch plates.

In a preferred embodiment, torque converter 10 is assembled, in part, via the stacking of set of mating components 50 in cover 20. Backing plate 40 is then pushed firmly against set of mating components 50, then lifted to the proper lift-off amount, and tac-welded in place. The remainder of torque converter 10 is then assembled, and impeller shell 30 is lifted to set the converter endplay and tacked to the backing plate. Torque converter 10 is then sealed by means of metal inert gas welding, which fixedly attaches cover 20 and impeller shell 30 to axial outer annular surface 45 of backing plate 40. In a preferred embodiment, as shown in the figure, this is accomplished via welds 27 and 37 between annular edges 24 and 34, respectively, and axial outer surface 45.

Figure 2:
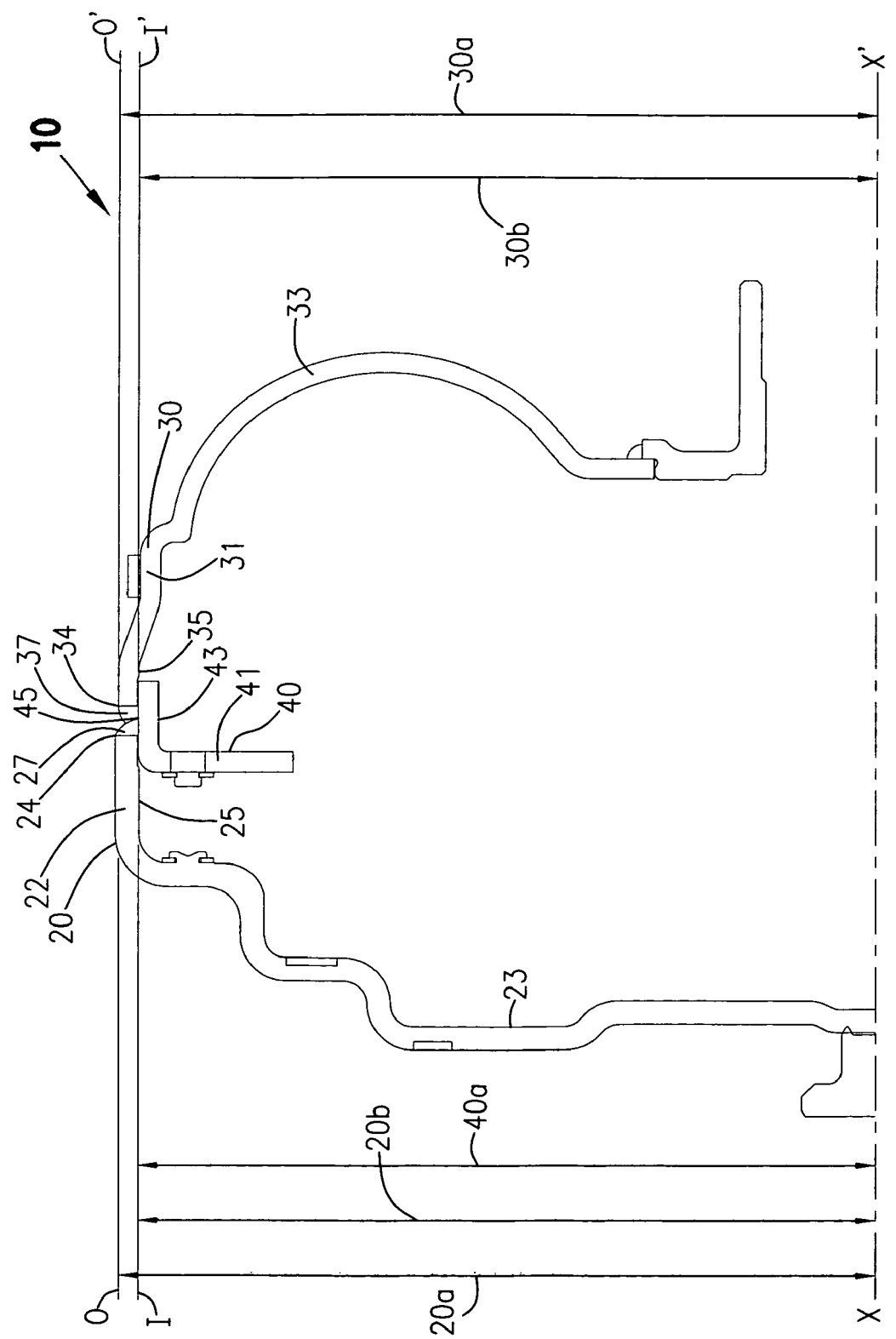

FIG. 2 shows partial cross-sectional view of torque converter 10 without most of its internal components for the sake of clarity. As stated supra, cover 20 and impeller shell 30 each comprise an outer diameter and an inner diameter, and backing plate 40 comprises an outer diameter. Hashed lines O-O' and I-I' are both parallel to axis X-X'. Line O-O' extends roughly tangentially with respect to the outer diameters of both cover 20 and impeller shell 30. However, the outer diameters of cover 20 and impeller shell 30 need not be equal. In some embodiments, impeller shell 30 is stamped from thinner material than cover 20, because impeller shell 30 gains strength from the blades (not shown) brazed on the toroidal surface. Line I-I' extends tangentially with respect to the inner diameter and axial inner annular surface 25 of cover 20, the inner diameter and axial inner annular surface 35 of impeller shell 30, and the outer diameter and axial outer annular surface 45 of backing plate 40. Lines 20a, 30a, and 40a represent the radial distance from axis X-X' to the outer diameters of cover 20, impeller shell 30, and backing plate 40, respectively. As can be seen in the figure, lines 20a and 30a are substantially equal in length, signifying that the outer diameters of cover 20 and impeller shell 30 are substantially equal. Lines 20b and 30b represent the radial distance from axis X-X' to the inner diameters of cover 20 and impeller shell 30, respectively. As can be seen in the figure lines 20b, 30b, and 40a are substantially equal in length, signifying that the inner diameters of cover 20 and impeller shell 30 are substantially equal to each other and to the outer diameter of backing plate 40.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A torque converter comprising:
    a transverse axis of rotation;
    a cover having an inner diameter, and an axial inner annular surface;
    an impeller shell having an inner diameter, and an axial inner annular surface; and,
    an annular backing plate having an outer diameter, a circumference, and an axial outer annular surface, wherein the cover, impeller shell, and backing plate are operatively arranged to rotate about the axis of rotation, wherein the backing plate is substantially orthogonal with respect to the axis of rotation, wherein the inner diameter of the cover is substantially equal to the inner diameter of the impeller shell, and wherein the axial inner annular surface of the cover and the axial inner annular surface of the impeller shell are fixedly attached to the axial outer annular surface of the backing plate.

2. The torque converter as recited in claim 1 wherein the annular backing plate further comprises an annular wall extending axially from its outer diameter.

3. The torque converter as recited in claim 1 wherein the axial inner annular surface of the cover and the axial inner annular surface of the impeller shell are fixedly attached to the axial outer annular surface of the backing plate by means of at least one weld.

4. The torque converter as recited in claim 3 wherein the at least one weld is made via metal inert gas welding.

5. The torque converter as recited in claim 1 wherein the cover is formed of stamped metal.

6. The torque converter as recited in claim 1 further comprising at least one mating component operatively arranged to rotate about the axis of rotation and receive torque from the backing plate.

7. The torque converter as recited in claim 1 further comprising at least one mating component, wherein the backing plate further comprises an annular surface substantially orthogonal with respect to the axis of rotation and in frictional engagement with the mating component, and wherein the mating component is operatively arranged to receive torque from the backing plate through the frictional engagement.

8. The torque converter as recited claim 7 wherein the at least one mating component is an annular plate.

9. The torque converter as recited in claim 1 further comprising a plurality of mating components serially arranged along the axis of rotation, and operatively arranged to rotate about the axis of rotation and receive torque from the backing plate.

10. The torque converter as recited claim 9 wherein the plurality of mating components comprise a plurality of clutch plates operatively arranged to transmit torque to each other through a plurality of frictional engagements therebetween.

11. A torque converter comprising:
    a transverse axis of rotation;
    a cover having an inner diameter, and an axial inner annular surface;
    an impeller shell having an inner diameter, and an axial inner annular surface; and,
    an annular backing plate having an outer diameter and an annular wall extending axially from its outer diameter, the wall defining an axial outer annular surface, wherein the cover, impeller shell, and backing plate are operatively arranged to rotate about the axis of rotation, wherein the backing plate is substantially orthogonal with respect to the axis of rotation, wherein the inner diameter of the cover is substantially equal to the inner diameter of the impeller shell, and wherein the axial inner annular surface of the cover and the axial inner annular surface of the impeller shell are fixedly attached to the axial outer annular surface of the backing plate, wherein the cover and the impeller shell are operatively arranged to transmit torque to the backing plate.

12. The torque converter as recited in claim 11 wherein the backing plate further comprises an annular surface substantially orthogonal with respect to the axis of rotation, wherein the torque converter further comprises at least one mating component in frictional engagement with the annular surface of the backing plate, and wherein the at least one mating component is operatively arranged to receive torque from the backing plate.

13. The torque converter as recited in claim 12 wherein the at least one mating component comprises an annular plate substantially orthogonal with respect to the axis of rotation.

14. The torque converter as recited in claim 12 further comprising a plurality of mating components operatively arranged to receive torque from the backing plate.

15. The torque converter as recited in claim 14 wherein the plurality of mating components comprise a series of annular clutch plates.

* * * * *